Aug. 7, 1928.
H. J. MURPHY
LUBRICATING APPARATUS
Filed March 14, 1922
1,679,735
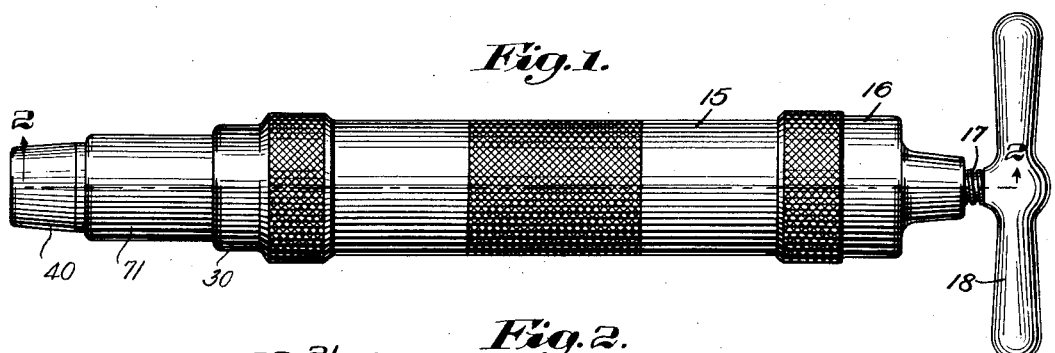
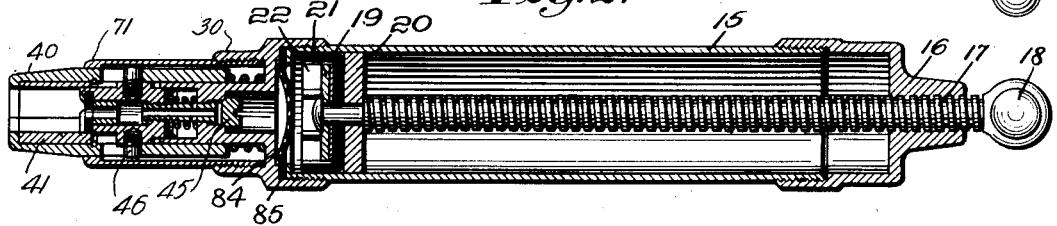
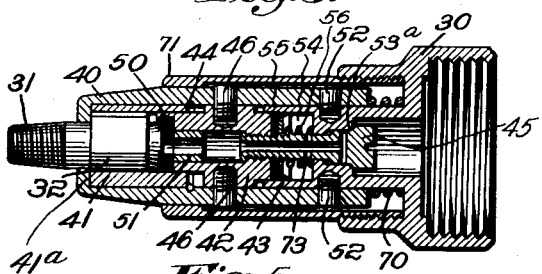
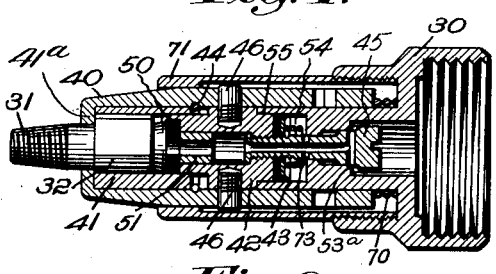
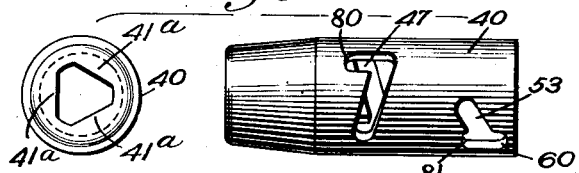
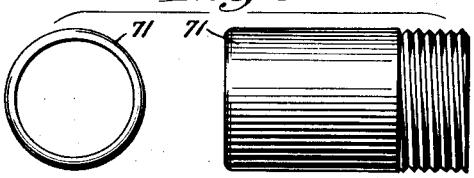
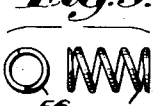
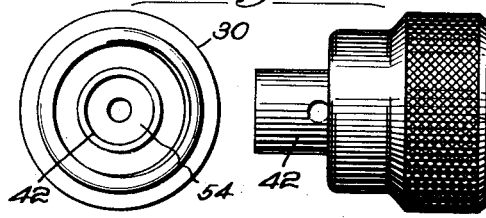
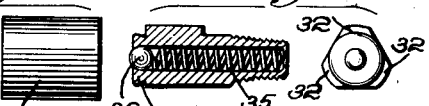
Inventor:
Howard J. Murphy
by Emery Booth Janney Varney Attys.

Patented Aug. 7, 1928.

1,679,735

UNITED STATES PATENT OFFICE.

HOWARD J. MURPHY, OF READING, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING APPARATUS.

Application filed March 14, 1922. Serial No. 543,656.

This invention pertains to improvements in lubricating systems and apparatus. It is among the objects of the invention to provide an efficient and readily operable source of lubricant under pressure for quick attachment to and detachment from lubricant receiving cups or nipples.

In the drawings, which show a preferred form or one illustrative embodiment of my invention:—

Figure 1 is a side elevation of a lubricant expelling "gun";

Fig. 2 is a central longitudinal section therethrough on the line 2—2 of Fig. 1, being partly in elevation, and showing the relative position of the valved coupling parts when disconnected from the lubricant receiving cup or nipple;

Fig. 3 is a section on the line 2—2 of Fig. 1, showing the discharge end of the gun after the coupling and sealing operations but with the valve closed;

Fig. 4 is a section on the line 2—2 of Fig. 1, showing the discharge end of the gun after completion of the valve opening operation;

Fig. 5 includes an end and a side elevation of a preferred coupling sleeve;

Fig. 6 includes an end and a side elevation of a preferred guiding and protecting sleeve;

Fig. 7 includes a side elevation and two end elevations of a preferred sealing part or gasket holder;

Fig. 8 includes an end and side elevation of a preferred valve plunger;

Fig. 9 includes end and side elevations of a preferred valve spring;

Fig. 10 includes end and side elevations of a preferred spring for pressing forward the coupling sleeve;

Fig. 11 includes a front and a side elevation of a preferred head presenting a valve seat;

Fig. 12 includes an end and a side elevation of a preferred connecting sleeve; and Fig. 13 includes a longitudinal section through and an end elevation of a preferred lubricant receiving cup or nipple.

Referring to the drawings and to the preferred form of my invention selected for illustrative purposes, I have shown a lubricant expelling device for grease, oil or the like and including a barrel 15, rear head 16 and stem 17 threaded to the rear head 16 and carrying at its rear or outer end a handle 18 and at its opposite or inner end a piston including the cup 19 of leather or other flexible material held between discs 20 and 21 which are secured to the stem 16 as by riveting over the end thereof. The cup 19 may be held expanded by an inner resilient cup-like member 22, having a slotted peripheral flange resiliently pressing outwardly on the leather cup 19 and a base held between the base of the leather cup 19 and the disc 21. The rear head 16 of the gun is preferably removable, being threaded to the exterior of the barrel 15 and preferably includes an interior recess of substantially the same diameter as the interior of the barrel 15, and of sufficient depth so that the leather cup on the head of the plunger, or piston, may be entirely withdrawn thereinto. The inner edge of the rear end of the barrel is preferably bevelled so that when the piston 21 is withdrawn into the rear head 16 and the latter unscrewed from the barrel, for filling the barrel, the head may be replaced and the piston again screwed forward into the barrel without difficulty and without danger of injuring the piston.

The front head 30 of the gun preferably has directly and rigidly carried thereby and in alignment with the barrel valve coupling means for quick engagement with and detachment from lubricant receiving nipples which may be mounted at appropriate points on the mechanism to be lubricated.

In the preferred form of my invention illustrated, the nipple includes a body threaded at 31 for entrance into the part to be lubricated, as is usual with grease cups and the like, projections 32, herein shown as three in number, which may be provided by a generally triangular cross-section of the nipple material at this point and a head portion, preferably generally cylindrical but somewhat undercut. The nipple is drilled longitudinally to provide an opening through which the lubricant may pass, a check valve 34 seating adjacent the lubricant-receiving end under pressure of a spring 35 preferably extending substantially the entire length of the nipple and held in place by spinning or otherwise distorting inwardly the material of the nipple body adjacent the threaded end thereof.

The preferred coupling illustrated for cooperation with the nipple includes a coupling sleeve 40 preferably retractile relative to the lubricant gun and having, at its outer end, an aperture shaped like the cross-section of the generally triangular portion of the nipple and providing sufficient clearance to permit passage of this portion therethrough. Laterally of this aperture the coupling sleeve presents flange portions 41ª adapted to underlie the projections on the nipple. The coupling sleeve presents interiorly an annular surface loosely fitting the exterior annular surfaces of the connecting sleeve 41, sealing part 42 and exterior 43 connected to and preferably integral with the front head 30 of the gun. The connecting sleeve 41 (see Fig. 12) has an aperture therethrough of generally triangular cross-section to admit the similarly shaped portion of the nipple. The sealing part 42, commonly used for and called a gasket holder, presents at its outer end a generally triangular portion entered in the end of the corresponding hole in the connecting sleeve 41, the latter preferably held against longitudinal movement in the coupling sleeve 40 by the flanges 41ª at the forward end and at the opposite end by a resilient ring 44 snapped into a groove on the interior of the coupling sleeve 40. The sealing part 42 is shown as longitudinally apertured and as carrying the valve part 45 preferably screwed thereinto and headed over for purposes of adjustment hereinafter more fully described. Pins 46, 46 secured in the sealing part 42 project therefrom into inclined cam slots 47 in the coupling sleeve 40.

The operation of the before-described coupling parts may be as follows: Assuming the nipple to be screwed into the part to be lubricated and held thereby against rotation, and assuming the coupling end of the gun to be slipped over the nipple until the flanges 41ª of the coupling sleeve are beyond the triangular portions of the nipple, the parts of the coupling in the relative position shown in Fig. 3, the lubricant receiving end of the nipple abutting against the gasket or sealing washer 50, considerable clearance will be provided between the under faces of the projections 32 of the nipple and the inner faces of the flanges 41ª on the coupling sleeve. The nipple will hold the connecting sleeve 41 against turning movement and the connecting sleeve will in turn hold the gasket holder (and incidentally the valve part 45) against turning movement. If now the coupling sleeve 40 be turned in clockwise direction, by turning the gun barrel as hereinafter described, the pins 46, 46, held against turning because the sealing part 42 cannot turn, will ride down the incline of the slots 47, thereby retracting the coupling sleeve as its flanges 41ª pass beneath the projections on the nipple until the nipple is firmly gripped by the coupling with the gasket 50 firmly pressed against the lubricant receiving end thereof, thus effecting a tight seal. If desired, the sealing part 42 may be recessed or provided with an aperture larger than the aperture in the gasket 50, thereby to provide a supplemental lubricant pressed seal cooperating with the mechanical seal before described, but I prefer, as illustrated, rigidly to back support the gasket 50 by the sealing part or a plug 51, which may be driven into the aperture after heading over the end of the valve part 45.

Having thus described the operation of the coupling, I will now describe the operation of coordinated valve operating means. The head 30 of the gun may conveniently provide an extension 43 presenting exteriorly a guiding surface for the coupling sleeve 40 and carrying valve pins 52, 52 entered in slots 53, 53 of the coupling sleeve 40. Interiorly the projection 43 presents a valve seat 53ª and a chamber 54 receiving the rear end of the sealing part 42. The head of the valve seats on the valve seat 53ª and in the chamber 54 a cup washer 55, spring-pressed by a valve spring 56, prevents escape of any lubricant which might work down between the valve part 45 and the valve-guiding portion of the head 30 which surrounds the valve part 45 beyond the head thereof.

The valve-controlling slots 53 are provided with detent portions 60, which preclude relative turning between the valve seat and coupling sleeve 40 until the latter has been retracted sufficiently to complete the coupling movement, when the pins 52 riding down the preferably steeply inclined slots 53, the sleeve remaining stationary, pull the valve seat and parts then rotating therewith forward, the valve part 45 remaining fixed, thus opening the valve by permitting the lubricant to pass into the interior thereof and thence to the nipple. During this valve opening movement, and also during the preceding coupling movement, the coupling sleeve spring 70 has been compressed, and, as the spring is relatively stiff, it will cooperate with the pressure of the lubricant in the gun to cause closure of the valve when torsion on the seat carrying portion thereof is effected, this because of the relatively steep incline of the valve opening portion of the slot 53.

The pitch of the screw of the stem 17 actuating the plunger of the barrel is such that torque to effect coupling, valve opening and lubricant expulsion is all in the same direction, preferably clockwise as shown. On the other hand, rotation in contra-clockwise direction initially closes the valve, preferably automatically as described, then releases the seal and permits uncoupling of the gun from the nipple.

The valve part 45 may be drilled to provide a passage 70 permitting escape of any lubricant confined in the chamber 54 into the port connecting with the nipple, which lubricant might oppose more or less opening of the valve if afforded no other egress. Where the passage 70 is present, the chamber 54 can receive lubricant which would otherwise pass to the nipple and thus a frequent change of the lubricant contained in such chamber is provided, precluding hardening thereof where grease or similar semi-solid lubricant is used.

The head 30 preferably carries a guide sleeve 71 to steady and strengthen the coupling sleeve 40, this guide sleeve being preferably chambered somewhat to provide a space surrounding the pins 46, 46 and 52, 52 so that these pins may extend entirely through the slots in the coupling sleeve 40, increasing the wearing surface and precluding "cutting"—while at the same time the surrounding space precludes binding of the ends of these pins on the guide sleeve. The guide sleeve also protects the slots etc. from dirt and, where the end of the surrounding portion of the head 30 is spun into a groove, serves to prevent tampering with the mechanism or to disclose the fact if the mechanism has been tampered with.

Where several parts cooperate to effect coupling and valve operation and there is a coordinated action as in the present embodiment of my invention, even slight variations in dimensions may, especially where cumulative, prevent proper operation of the device. To avoid this and at the same time to avoid undue increase in manufacturing costs arising from adoption of unusually close "limits", I have provided for adjustment of the distance between the under side of the head of the valve 45 and the face of the sealing washer 50. This single adjustment made once when assembling the parts will compensate for considerable variations in the longitudinal dimensions of the parts. To this end, I screw the valve part 45 into the sealing part 42 until the pins 52 are nearly out of the detent recesses 60 when coupling is completed, and then head over the inner end of the valve part 42 against a shoulder within the sealing part 42 which precludes rotary movement of the valve part 45 relative to the sealing part 42 in the only direction where there is any tendency toward such movement in the operation of the device. The plug 51 may then be driven in if desired, to back-support the sealing gasket 50 and prevent tampering with the valve from the outer end. Where tampering with the inner end is feared, a special socket wrench connection may be provided to take the place of the screw driver slot illustrated across the head of the valve part 45. The extension 80 of the slot 47 precludes opening of the valve by direct pressure on the coupling sleeve, while the extension 81 of the slot precludes turning of the sleeve relative to the cooperating parts pursuant to such pressing in of the valve sleeve. Incidentally, the extensions 60, 80 and 81 admit of the use of a drilling tool of greater diameter than the slots proper, so that the slot milling tool may be readily started on its work in an accurate manner.

Between the end of the barrel 15 and the head 30, I have shown a screen 84 (Fig. 2) underlying a gasket 85, the adjacent end of the barrel flanged inwardly to hold the gasket and the screen in place when the head is screwed to the barrel. The flange prevents cutting of the gasket, the gasket provides a tight joint and the screen prevents any solid object of considerable size from passing therethrough to choke the ports in the valve coupling or to interfere with closure of the valve. Any small foreign object will not interfere with valve closure, especially as the valve parts turn relative to each other when closing, this turning action promoting tight closure of the valve and displacement of any interposed small solid object.

The operation of the device is simple, rotation of the gun barrel or handle 18 (when the lubricant is under pressure) in one direction initially coupling, then sealing, then opening the valve and expelling the lubricant. Similarly, rotation in the opposite direction initially closes the valve, preferably leaving pressure on the lubricant in the barrel, then unseals and finally uncouples the gun from the lubricant-receiving nipple.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. Lubricating apparatus comprising, a lubricant gun for torsional engagement with a lubricant-receiving nipple, said gun presenting a valved coupling and interengaging pin and slot means independent of the coupling means between the gun and nipple for automatically effecting closure of said valve on release of torsion on said gun.

2. Lubricating apparatus comprising, in combination, a lubricant gun having associated with the discharge end thereof a coupling and a longitudinally movable valve, coordinated means independent of the coupling means between the gun and nipple for controlling operation of said valve, said valve longitudinally adjustable relative to a coupling part and valve seat part to provide the desired relative operation and to compensate for variations in the longitudinal dimensions of the coupling and valve parts, one end of said valve part being riveted after adjustment to preclude movement thereof relative to the coupling part to which it is attached.

3. A lubricant-expelling device presenting a coupling sleeve slotted to provide cam surfaces, pins projecting through said sleeve and an exterior guiding and protecting sleeve chambered adjacent the exterior ends of said pins while guiding and supporting said coupling sleeve.

4. Lubricating apparatus comprising a lubricant-expelling gun having a discharge end carrying a valve, a sealing part, a coupling sleeve and pin and slot means directly connecting said part and said sleeve for controlling coupling and valve operation of the device when being engaged with or disengagement from a lubricant-receiving nipple.

In testimony whereof, I have signed my name to this specification.

HOWARD J. MURPHY.